US011838557B2

(12) United States Patent
Chiu et al.

(10) Patent No.: US 11,838,557 B2
(45) Date of Patent: Dec. 5, 2023

(54) METHODS AND APPARATUSES OF ALF DERIVATION IN VIDEO ENCODING SYSTEM

(71) Applicant: MEDIATEK INC., Hsinchu (TW)

(72) Inventors: Shih-Chun Chiu, Hsinchu (TW);
Chih-Wei Hsu, Hsinchu (TW);
Ching-Yeh Chen, Hsinchu (TW);
Chun-Chia Chen, Hsinchu (TW);
Tzu-Der Chuang, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/726,713

(22) Filed: Apr. 22, 2022

(65) Prior Publication Data
US 2023/0156234 A1 May 18, 2023

Related U.S. Application Data

(60) Provisional application No. 63/280,174, filed on Nov. 17, 2021.

(51) Int. Cl.
*H04N 19/82* (2014.01)
*H04N 19/117* (2014.01)
*H04N 19/124* (2014.01)
*H04N 19/186* (2014.01)
*H04N 19/147* (2014.01)

(52) U.S. Cl.
CPC .......... *H04N 19/82* (2014.11); *H04N 19/117* (2014.11); *H04N 19/124* (2014.11); *H04N 19/147* (2014.11); *H04N 19/186* (2014.11)

(58) Field of Classification Search
CPC ................. A61B 3/0033; A61B 3/066; G02B 2027/0112; G02B 2027/0118; G02B 2027/0141; G02B 2027/0181; G02B 27/0101

See application file for complete search history.

(56) References Cited

U.S. PATENT DOCUMENTS

| 2015/0350648 A1 | 12/2015 | Fu et al. | |
| 2017/0163982 A1* | 6/2017 | Fu | H04N 19/154 |
| 2019/0261020 A1* | 8/2019 | Galpin | H04N 19/60 |

(Continued)

OTHER PUBLICATIONS

Chinese language office action dated Jul. 27, 2022, issued in application No. TW 111118168.

*Primary Examiner* — Md N Haque
(74) *Attorney, Agent, or Firm* — McClure, Qualey & Rodack, LLP

(57) ABSTRACT

Video encoding methods and apparatuses include receiving reconstructed video samples, determining an initial clipping setting for ALF coefficients, deriving clipping setting candidates from the initial clipping setting. ALF coefficients for the initial clipping setting and the clipping setting candidates are derived by solving inverse matrices, where partial intermediate results of solving ALF coefficients are shared by two or more clipping settings. A distortion value corresponds to the derived ALF coefficients for each clipping setting is computed, and final clipping indices for final ALF coefficients are determined according to the distortion values. ALF filtering is applied to the reconstructed video samples based on the final ALF coefficients and the final clipping indices.

15 Claims, 8 Drawing Sheets

(56) References Cited

U.S. PATENT DOCUMENTS

| | | | | | |
|---|---|---|---|---|---|
| 2020/0314424 | A1* | 10/2020 | Hu | ................. | H04N 19/117 |
| 2020/0329239 | A1* | 10/2020 | Hsiao | ................. | H04N 19/70 |
| 2020/0366891 | A1* | 11/2020 | Hu | ................. | H04N 19/186 |
| 2020/0396452 | A1* | 12/2020 | Hu | ................. | H04N 19/70 |
| 2022/0248006 | A1* | 8/2022 | Lim | ................. | H04N 19/96 |
| 2022/0303584 | A1* | 9/2022 | Du | ................. | H04N 19/186 |

* cited by examiner

First Row Elimination

First Row Elimination $$\begin{bmatrix} e_{11} & e_{12} & e_{13} & e_{14} & e_{15} & e_{16} & y_1 \\ e_{21} & e_{22} & e_{23} & e_{24} & e_{25} & e_{26} & y_2 \\ e_{31} & e_{32} & e_{33} & e_{34} & e_{35} & e_{36} & y_3 \\ e_{41} & e_{42} & e_{43} & e_{44} & e_{45} & e_{46} & y_4 \\ e_{51} & e_{52} & e_{53} & e_{54} & e_{55} & e_{56} & y_5 \\ e_{61} & e_{62} & e_{63} & e_{64} & e_{65} & e_{66} & y_6 \end{bmatrix} \qquad \begin{bmatrix} e_{11} & e_{12} & e_{13} & e_{14} & e_{15}' & e_{16}' & y_1 \\ e_{21} & e_{22} & e_{23} & e_{24} & e_{25}' & e_{26}' & y_2 \\ e_{31} & e_{32} & e_{33} & e_{34} & e_{35}' & e_{36}' & y_3 \\ e_{41} & e_{42} & e_{43} & e_{44} & e_{45}' & e_{46}' & y_4 \\ e_{51}' & e_{52}' & e_{53}' & e_{54}' & e_{55}' & e_{56}' & y_5' \\ e_{61}' & e_{62}' & e_{63}' & e_{64}' & e_{65}' & e_{66}' & y_6' \end{bmatrix}$$

For candidate 5
(0,0,0,0,1,0)
25 multiplications

For candidate 6
(0,0,0,0,0,1)
25 multiplications

Fig. 5

First Row Elimination $$\begin{bmatrix} e_{11} & e_{12} & e_{13} & e_{14} & e_{15} & e_{16} & y_1 \\ e_{21} & e_{22} & e_{23} & e_{24} & e_{25} & e_{26} & y_2 \\ e_{31} & e_{32} & e_{33} & e_{34} & e_{35} & e_{36} & y_3 \\ e_{41} & e_{42} & e_{43} & e_{44} & e_{45} & e_{46} & y_4 \\ e_{51} & e_{52} & e_{53} & e_{54} & e_{55} & e_{56} & y_5 \\ e_{61} & e_{62} & e_{63} & e_{64} & e_{65} & e_{66} & y_6 \end{bmatrix} \qquad \begin{bmatrix} e_{11} & e_{12} & e_{13} & e_{14} & e_{15}' & e_{16}' & y_1 \\ e_{21} & e_{22} & e_{23} & e_{24} & e_{25}' & e_{26}' & y_2 \\ e_{31} & e_{32} & e_{33} & e_{34} & e_{35}' & e_{36}' & y_3 \\ e_{41} & e_{42} & e_{43} & e_{44} & e_{45}' & e_{46}' & y_4 \\ e_{51}' & e_{52}' & e_{53}' & e_{54}' & e_{55}' & e_{56}' & y_5' \\ e_{61}' & e_{62}' & e_{63}' & e_{64}' & e_{65}' & e_{66}' & y_6' \end{bmatrix}$$

For candidate 5
(0,0,0,0,1,0)

For candidate 6
(0,0,0,0,0,1)

Fig. 6 candidate 5

$$\begin{pmatrix} e_{11} & e_{12} & e_{13} & e_{14} & e_{15} & e_{16} & y_1 \\ e_{21} & e_{22} & e_{23} & e_{24} & e_{25} & e_{26} & y_2 \\ e_{31} & e_{32} & e_{33} & e_{34} & e_{35} & e_{36} & y_3 \\ e_{41} & e_{42} & e_{43} & e_{44} & e_{45} & e_{46} & y_4 \\ e_{51} & e_{52} & e_{53} & e_{54} & e_{55} & e_{56} & y_5 \\ e_{61} & e_{62} & e_{63} & e_{64} & e_{65} & e_{66} & y_6 \end{pmatrix}$$

$$\rightarrow \begin{array}{cccccc} \frac{e_{12}e_{21}}{e_{11}} & \frac{e_{13}e_{21}}{e_{11}} & \frac{e_{14}e_{21}}{e_{11}} & \frac{e_{15}e_{21}}{e_{11}} & \frac{e_{16}e_{21}}{e_{11}} & \frac{y_1 e_{21}}{e_{11}} \\ \frac{e_{12}e_{31}}{e_{11}} & \frac{e_{13}e_{31}}{e_{11}} & \frac{e_{14}e_{31}}{e_{11}} & \frac{e_{15}e_{31}}{e_{11}} & \frac{e_{16}e_{31}}{e_{11}} & \frac{y_1 e_{31}}{e_{11}} \\ \frac{e_{12}e_{41}}{e_{11}} & \frac{e_{13}e_{41}}{e_{11}} & \frac{e_{14}e_{41}}{e_{11}} & \frac{e_{15}e_{41}}{e_{11}} & \frac{e_{16}e_{41}}{e_{11}} & \frac{y_1 e_{41}}{e_{11}} \\ \frac{e_{12}e_{51}}{e_{11}} & \frac{e_{13}e_{51}}{e_{11}} & \frac{e_{14}e_{51}}{e_{11}} & \frac{e_{15}e_{51}}{e_{11}} & \frac{e_{16}e_{51}}{e_{11}} & \frac{y_1 e_{51}}{e_{11}} \\ \frac{e_{12}e_{61}}{e_{11}} & \frac{e_{13}e_{61}}{e_{11}} & \frac{e_{14}e_{61}}{e_{11}} & \frac{e_{15}e_{61}}{e_{11}} & \frac{e_{16}e_{61}}{e_{11}} & \frac{y_1 e_{61}}{e_{11}} \end{array}$$

Total: 25 multiplications candidate 6

$$\begin{pmatrix} e_{11} & e_{12} & e_{13} & e_{14} & e_{15}' & e_{16}' & y_1 \\ e_{21} & e_{22} & e_{23} & e_{24} & e_{25}' & e_{26}' & y_2 \\ e_{31} & e_{32} & e_{33} & e_{34} & e_{35}' & e_{36}' & y_3 \\ e_{41} & e_{42} & e_{43} & e_{44} & e_{45}' & e_{46}' & y_4 \\ e_{51}' & e_{52}' & e_{53}' & e_{54}' & e_{55}' & e_{56}' & y_5' \\ e_{61}' & e_{62}' & e_{63}' & e_{64}' & e_{65}' & e_{66}' & y_6' \end{pmatrix}$$

6 multiplications $$\rightarrow \begin{array}{cccccc} \frac{e_{12}e_{21}}{e_{11}} & \frac{e_{13}e_{21}}{e_{11}} & \frac{e_{14}e_{21}}{e_{11}} & \frac{e_{15}'e_{21}}{e_{11}} & \frac{e_{16}'e_{21}}{e_{11}} & \frac{y_1 e_{21}}{e_{11}} \\ \frac{e_{12}e_{31}}{e_{11}} & \frac{e_{13}e_{31}}{e_{11}} & \frac{e_{14}e_{31}}{e_{11}} & \frac{e_{15}'e_{31}}{e_{11}} & \frac{e_{16}'e_{31}}{e_{11}} & \frac{y_1 e_{31}}{e_{11}} \\ \frac{e_{12}e_{41}}{e_{11}} & \frac{e_{13}e_{41}}{e_{11}} & \frac{e_{14}e_{41}}{e_{11}} & \frac{e_{15}'e_{41}}{e_{11}} & \frac{e_{16}'e_{41}}{e_{11}} & \frac{y_1 e_{41}}{e_{11}} \\ \frac{e_{12}'e_{51}}{e_{11}} & \frac{e_{13}'e_{51}}{e_{11}} & \frac{e_{14}'e_{51}}{e_{11}} & \frac{e_{15}'e_{51}}{e_{11}} & \frac{e_{16}'e_{51}}{e_{11}} & \frac{y_1'e_{51}}{e_{11}} \\ \frac{e_{12}'e_{61}}{e_{11}} & \frac{e_{13}'e_{61}}{e_{11}} & \frac{e_{14}'e_{61}}{e_{11}} & \frac{e_{15}'e_{61}}{e_{11}} & \frac{e_{16}'e_{61}}{e_{11}} & \frac{y_1'e_{61}}{e_{11}} \end{array}$$

4+3 multiplications

Total: 13 multiplications

Fig. 7

METHODS AND APPARATUSES OF ALF DERIVATION IN VIDEO ENCODING SYSTEM

CROSS REFERENCE TO RELATED APPLICATIONS

The present invention claims priority to U.S. Provisional Patent Application, Ser. No. 63/280,174, filed on Nov. 17, 2021, entitled "Efficient ALF Filter Coefficient Derivation". The U.S. Provisional Patent Application is hereby incorporated by reference in its entirety.

FIELD OF THE INVENTION

The present invention relates to video data processing methods and apparatuses for video encoding. In particular, the present invention relates to Adaptive Loop Filter (ALF) derivation in a video encoding system.

BACKGROUND AND RELATED ART

The Versatile Video Coding (VVC) standard is the latest video coding standard developed by the Joint Collaborative Team on Video Coding (JCT-VC) group of video coding experts from ITU-T Study Group. The VVC standard inherited former High Efficiency Video Coding (HEVC) standard which relies on a block-based coding structure, where each video picture contains one or a collection of slices and each slice is divided into an integer number of Coding Tree Units (CTUs). The individual CTUs in a slice are processed according to a raster scanning order. Each CTU is further recursively divided into one or more Coding Units (CUs) to adapt to various local motion and texture characteristics. The prediction decision is made at the CU level, where each CU is either coded by inter picture prediction or intra picture prediction. A specified prediction process is employed to predict the values of associated pixel samples inside the CU. After obtaining a residual signal generated by the prediction process, residual data of the residual signal belong to a CU is then transformed into transform coefficients for compact data representation. These transform coefficients are quantized and conveyed to the decoder. The terms Coding Tree Block (CTB) and Coding block (CB) are defined to specify two-dimensional sample array of one color component associated with the CTU and CU respectively. For example, a CTU consists of one luminance (luma, Y) CTB, two chrominance (chroma, Cb and Cr) CTBs, and its associated syntax elements.

Adaptive Loop Filter (ALF) is an effective in-loop filter for compression artifact reduction adopted in the VVC standard. ALF minimizes the Minimum Square Errors (MSE) between original samples and decoded samples using Wiener-based adaptive filter coefficients. ALF filtering on reconstructed video samples follows Equation (1):

reconstruction after ALF=reconstruction before ALF+$\Sigma_c(n_c f_c)$;     (1)

where c denotes the number of coefficients, for example, 12 ALF coefficients for the luma component, 6 ALF coefficients for the chroma components, and 7 ALF coefficients for the Cross Component ALF (CCALF), $n_c$ is the neighboring information derived from reconstruction before ALF and its neighboring samples, and $f_c$ is the ALF coefficients.

In an example of applying ALF filtering on chroma samples as shown in FIG. 1, $p_6$ is the current processing sample, and neighboring information $n_c$ is derived by the following process. ALF provides a clipping index $clip_c \in \{0, 1, 2, 3\}$ for each coefficient $f_c$, and neighboring information $n_c$ is determined by $n_c = n_c[clip_c]$ as illustrated in Equations (2).

$$n_c[0] = \text{Clip3}(-1024, 1024, p_c - p_6) + \text{Clip3}(-1024, 1024, q_c - p_6); \quad (2)$$

$$n_c[1] = \text{Clip3}(-128, 128, p_c - p_6) + \text{Clip3}(-128, 128, q_c - p_6);$$

$$n_c[2] = \text{Clip3}(-32, 32, p_c - p_6) + \text{Clip3}(-32, 32, q_c - p_6);$$

$$n_c[3] = \text{Clip3}(-8, 8, p_c - p_6) + \text{Clip3}(-8, 8, q_c - p_6);$$

$$\text{where Clip3}(-T, T, x) = \begin{cases} -T, & \text{if } x < -T \\ T, & \text{if } x > T \\ x, & \text{otherwise} \end{cases}$$

Optimized ALF clipping indices are derived by solving inverse matrices ALF coefficients in multiple iterations. For example, the ALF clipping index optimization algorithm for a six-coefficient ALF starts from an initial clipping setting ($c_0, c_1, c_2, \ldots, c_5$). Six clipping setting candidates are derived from the initial clipping setting. In each of the six clipping setting candidates, only one clipping index is adjusted while other clipping indices are unchanged, and optimal ALF coefficients are solved for each of the clipping setting candidates. A corresponding Sum of Square Difference (SSD) is then calculated associated with the initial clipping setting and each of the clipping setting candidates. The minimum SSD among the seven SSDs is selected, and the clipping candidate setting associated with the minimum SSD is designated as the initial clipping setting in a subsequent iteration. The same process is repeated until the initial clipping setting is selected as none of the clipping setting candidates leads to a smaller SSD.

FIG. 2 illustrates an example of an ALF clipping index optimization process for an ALF with six-coefficients. In this example, it is assumed there are only two possible values for clipping indices, and these two possible values are represented by 0 and 1. In the first iteration of the ALF clipping index optimization process, an initial clipping setting is (0, 0, 0, 0, 0, 0), and six corresponding clipping setting candidates including candidate 1 to candidate 6 are derived by only adjusting one clipping index of the initial clipping setting. For each clipping setting in the first iteration, optimal ALF coefficients are determined by solving an inverse matrix and a corresponding SSD is computed. A minimum SSD is selected among SSD0 for the initial clipping setting and SSD1 to SSD6 for the six clipping setting candidates. In this example, SSD3 associated with candidates 3 (0, 0, 1, 0, 0, 0) is the minimum SSD, thus candidate 3 becomes the initial clipping setting in the second iteration. Six clipping setting candidates for the second iteration are derived by only adjusting one clipping index of the initial clipping setting (0, 0, 1, 0, 0, 0). Similarly, optimal ALF coefficients for each clipping setting are determined and a corresponding SSD for each clipping setting is computed. A minimum SSD among SSD0 to SSD6 is selected, and if any of SSD1 to SSD6 is selected, a third iteration is performed in the same way as the first and second iterations; otherwise the ALF clipping index optimization process is terminated. The ALF clipping index optimization process repeats until none of SSD1 to SSD6 associated with the clipping setting candidates is lower than SSD0 associated with the initial clipping setting, which leads to SSD reduction in this iteration.

In each iteration of the ALF clipping index optimization process, Gaussian elimination is used to solve an inverse matrix to determine optimal ALF coefficients for each clipping setting. The process of Gaussian elimination for a 6×6 matrix and a 6 entry vector involves seven steps: the first six steps are row elimination steps and the last step is normalization. FIG. 3 illustrates before and after applying Gaussian elimination to a 6×6 matrix and 6 entry vector, a matrix E and a vector Y becomes a diagonal matrix and an updated vector after applying Gaussian elimination. The first step of Gaussian elimination is referred to as the first row elimination step, where the first entries of second to sixth rows are eliminated using the first row, and the second step is the second row elimination step, where the second entries of rows other than the second row are eliminated using the second row. Similarly, the third entries of rows other than the third row are eliminated using the third row in the third row elimination step, the fourth entries of rows other than the fourth row are eliminated using the fourth row in the fourth row elimination step, the fifth entries of rows other than the fifth row are eliminated using the fifth row in the fifth row elimination step, and the sixth entries of rows other than the sixth row are eliminated using the sixth row in the sixth row elimination step. FIG. 4 illustrates the computational operations in the first row elimination of Gaussian elimination for solving six ALF coefficients. Each matrix entry except for the first row or first column of the matrix is updated by subtracting a corresponding value as shown in FIG. 4. For example, the entry operation for a matrix entry $e_{22}$ is shown in Equation (3), where the updated entry is equal to the original entry value ($e_{22}$) minus a multiple of the second entry value in the first row ($e_{12}$) and the first entry value in the second row ($e_{21}$) divided by the first entry value in the first row ($e_{11}$).

$$e_{22} \rightarrow e_{22} - e_{12}\frac{e_{21}}{e_{11}} \quad (3)$$

The first row elimination step is given as an example as the entry operations for other row elimination steps are similar to the entry operations in the first row elimination step. Each entry operation in the conventional first row elimination includes one multiplication, one division, and one subtraction. In the last step of normalization, updated entries x1 to x6 of the vector can be derived by: $x_1=\hat{y}_1/\hat{e}_{11}$, $x_2=\hat{y}_2/\hat{e}_{22}$, $x_3=\hat{y}_3/\hat{e}_{33}$, $x_4=\hat{y}_4/\hat{e}_{44}$, $x_5=\hat{y}_5/\hat{e}_{55}$, $x_6=\hat{y}_6/\hat{e}_{66}$.

BRIEF SUMMARY OF THE INVENTION

In some embodiments of video encoding methods for an ALF clipping index optimization process implemented in a video encoding system, the video encoding methods receive reconstructed video samples, determines an initial clipping setting for ALF coefficients, drives a number of clipping setting candidates from the initial clipping setting and derives ALF coefficients for each clipping setting by solving an inverse matrix. The clipping settings include the initial clipping setting and the derived clipping setting candidates. Partial intermediate results of solving ALF coefficients are shared by two or more clipping settings to reduce the number of multiplication operations required in the ALF clipping index optimization process. The video encoding methods further include calculating a distortion value corresponding to the derived ALF coefficients for each clipping setting, determining final clipping indices for final ALF coefficients according to the distortion values, and applying ALF filtering to the reconstructed video samples based on the final ALF coefficients and final clipping indices. An example of the distortion value is a Sum of Square Difference (SSD) of distortions caused by applying ALF filtering.

An embodiment of the step of determining final clipping indices for final ALF coefficients further includes comparing the distortion values associated with the clipping settings, selecting a clipping setting having a minimum distortion value, and determining the final clipping indices to be clipping indices of the clipping setting having the minimum distortion value. In some other embodiments, more than one iteration is used to derive the final clipping indices. For example, the distortion values associated with the clipping settings are compared to select a clipping setting having a minimum distortion value. Clipping indices of the initial clipping setting are set as the final clipping indices when the clipping setting having the minimum distortion value is the initial clipping setting; otherwise, when the clipping setting having the minimum distortion value is one of the clipping setting candidates, this clipping setting candidate is set as an initial clipping setting for a subsequent iteration of the ALF clipping index optimization process. In each iteration, a number of clipping setting candidates are derived from the initial clipping setting, the video encoding system solves inverse matrices for ALF coefficients to derive ALF coefficients for the clipping settings including the initial clipping setting and the derived clipping setting candidates, where partial intermediate results of solving ALF coefficients are shared by two or more clipping settings. The video encoding system calculates a distortion value for each clipping setting and selects a clipping setting having a minimum distortion value by comparing the distortion values. The final clipping indices are set to be clipping indices of the initial clipping setting when the clipping setting having the minimum distortion value is the initial clipping setting; otherwise another iteration is required by setting the clipping setting having the minimum distortion value as an initial clipping setting.

In some embodiments of the ALF clipping index optimization process, the inverse matrices associated with the clipping settings sharing the partial intermediate results are collectively solved in parallel. In another embodiments, the inverse matrices associated with the clipping setting sharing the partial intermediate results are collectively solved sequentially. The step of deriving clipping setting candidates from the initial clipping setting comprises deriving each clipping setting candidate by only adjusting one clipping index of the initial clipping setting.

Each of the clipping settings contains twelve clipping indices when the reconstructed video samples are luma samples, or each contains six clipping indices when the reconstructed video samples are chroma samples, or each contains seven clipping indices when applying CCALF to the reconstructed video samples. The partial intermediate results of solving ALF coefficients shared by the two or more clipping settings correspond to matrix entries with same entry operations to be performed in a row elimination step of Gaussian elimination.

Embodiments of a video encoding method for an ALF coefficient quantization optimization process comprise receiving reconstructed video samples, determining an initial setting for quantization of ALF coefficients, deriving setting candidates from the initial clipping setting, and calculating a distortion difference between the initial setting and each of the setting candidates without computing a distortion value for each of the setting candidates. The video encoding method further determines final quantized values for the Alf coefficients according to the distortion differences, and applies ALF filtering to the reconstructed video samples based on the final quantized values for the ALF coefficients. Embodiments of the ALF coefficient quantization optimization process reduce the computational complexity as computing distortion differences requires less operations than computing distortion values.

In some embodiments of determining final quantized values for the ALF coefficients, the distortion differences associated with the setting candidates are compared to select a setting candidate having a minimum distortion difference. The final quantized values for the ALF coefficients are determined to be quantized values of the initial setting or the setting candidate having the minimum distortion difference according to some embodiments of the present invention. In one embodiment, the final quantized values for the ALF coefficients are determined to be quantized values of the setting candidate having the minimum distortion difference when the minimum distortion difference is less than zero, and the final quantized values for the ALF coefficients are determined to be quantized values of the initial setting when the minimum distortion difference is larger than or equal to zero. In some embodiments, when the minimum distortion difference is less than zero, the setting candidate having the minimum distortion difference is determined to be an initial setting for a subsequent iteration of the ALF coefficient quantization optimization process, and the steps of deriving setting candidates, calculating and comparing distortion differences, selecting a setting candidate having a minimum distortion difference are repeated until the minimum distortion difference is larger than or equal to zero. The final quantized values for the ALF coefficients are quantized values of the initial setting when the minimum distortion difference is larger than or equal to zero. In some embodiments, the step of deriving setting candidates from the initial setting comprises deriving each setting candidate by only adjusting one quantized value of the initial setting.

Aspects of the disclosure further provide an apparatus for the video encoding system to perform an ALF clipping index optimization process. The apparatus comprises one or more electronic circuits configured for receiving reconstructed video samples, determining an initial clipping setting for ALF coefficients, and deriving multiple clipping setting candidates from the initial clipping setting, deriving ALF coefficients for clipping settings including the initial clipping setting and clipping setting candidates by solving inverse matrices for ALF coefficients. Partial intermediate results of solving ALF coefficients are shared by two or more clipping settings. The apparatus calculates a distortion value corresponding to the derived ALF coefficients for each clipping setting and determines final clipping indices for final ALF coefficients according to the distortion values, and applies ALF filtering to the reconstructed video samples based on the final ALF coefficients and the final clipping indices. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein:

FIG. 5 shows the inverse matrices associated with candidate 5 and candidate 6 to be solved in the first iteration of the ALF clipping index optimization process.

FIG. 6 shows common entries between the two inverse matrices associated with candidates 5 and 6 to be solved in the first iteration of the ALF clipping index optimization process.

FIG. 7 illustrates sharing some operations when solving the inverse matrices of candidate 5 and 6 collectively to reduce the number of multiplication operations according to an embodiment of the preset invention.

DETAILED DESCRIPTION OF THE INVENTION

Figure 1:
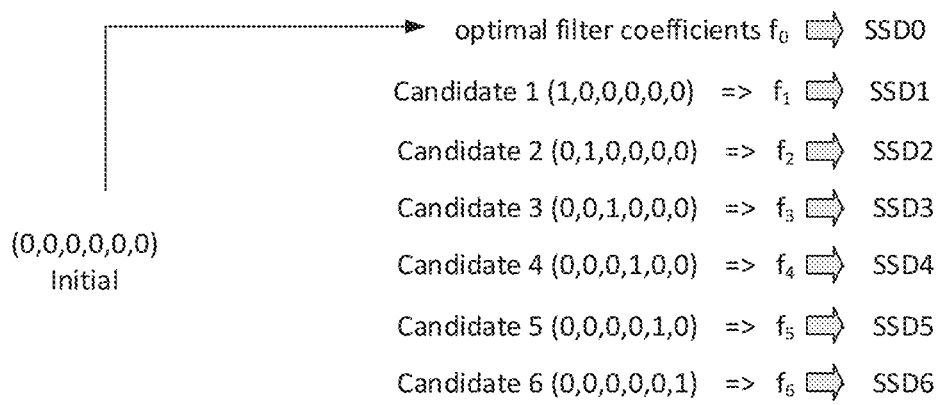
FIG. 1 illustrates neighboring samples of a current chroma sample used to derive a reconstruction sample for the current chroma sample after applying ALF.
Figure 2:
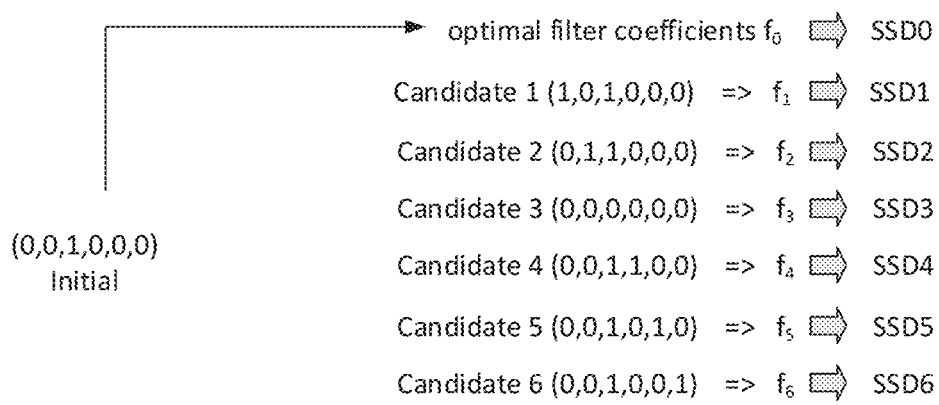
FIG. 2 illustrates the steps involved in a first iteration of an ALF clipping index optimization process for a six-coefficient ALF.
Figure 3:
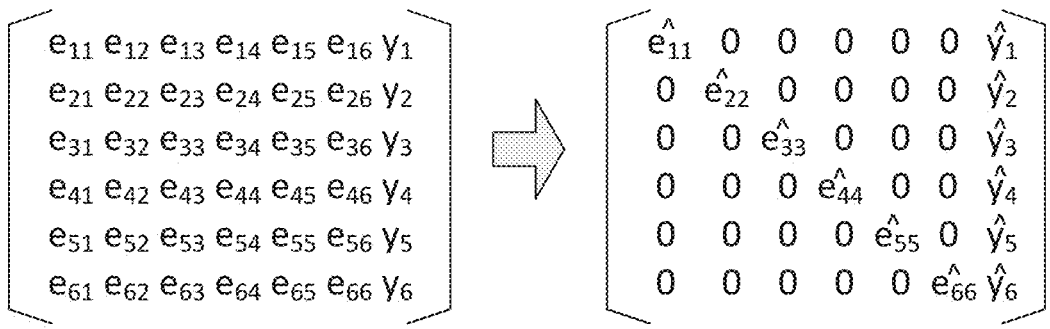
FIG. 3 illustrates before and after applying Gaussian elimination to a 6×6 matrix and 6 entry vector.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

In the video encoding process, Gaussian elimination is applied in ALF clipping index optimization to derive optimal ALF coefficients for multiple clipping settings, and one clipping setting minimizing the distortion of video encoding is selected for ALF filtering. In one embodiment, final clipping indices for final ALF coefficients are determined by comparing distortion values associated with the clipping settings including an initial clipping setting and clipping setting candidates, selecting a clipping setting having a minimum distortion value, and determining the final clipping indices to be clipping indices of the clipping setting having the minimum distortion value. In some other embodiments, multiple iterations are involved to determine the final clipping indices for ALF coefficients. The clipping setting having a minimum distortion value is set to be an initial clipping setting for a subsequent iteration. In each iteration, multiple clipping setting candidates are derived from the initial clipping setting, inverse matrices for these clipping settings are solved, distortion values for these clipping settings are calculated, and clipping indices of the initial clipping setting are set to be the final clipping indices if the distortion value for the initial clipping setting is the lowest. Otherwise, a clipping setting having a minimum distortion value is set to be an initial clipping setting for another iteration. Embodiments of the present invention solve inverse matrices for filter coefficients in ALF clipping index optimization by sharing some operations or intermediate results between multiple clipping settings in Gaussian elimination.

Figure 4:
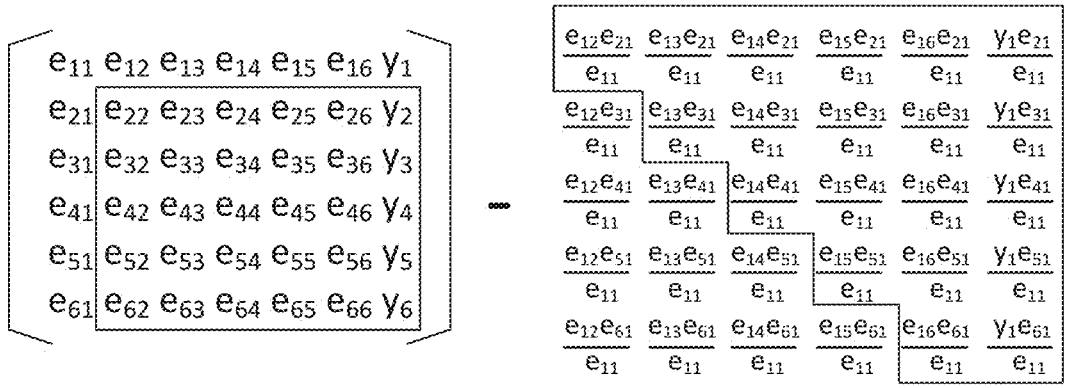
FIG. 4 shows entry operations for solving a 6×6 matrix and 6 entry vector of FIG. 3 executed in the first row elimination step of Gaussian elimination.

As shown in FIG. 4, the entry operations in the first row elimination step for matrix entries $e_{22}$, $e_{23}$, $e_{24}$, $e_{25}$, $e_{26}$, and $y_2$ require 7 multiplications. The entry operations for matrix entries $e_{32}$, $e_{33}$, $e_{34}$, $e_{35}$, $e_{36}$, and $y_3$ require 6 multiplications as the entry operation for $e_{32}$ can be skipped due to the symmetrical property. Similarly, the entry operations for matrix entries $e_{42}$ to $y_4$ require 5 multiplications, the entry operations for matrix entries $e_{52}$ to $y_5$ require 4 multiplications, and the entry operations $e_{62}$ to $y_6$ require 3 multiplications. For each clipping candidate setting, a total of 25 multiplication operations (7+6+5+4+3) are required in the first row elimination step. For two matrices associated with two clipping setting candidates, each operation in this first row elimination step is done twice, which means 50 multiplication operations are required. As shown in FIG. 5, 25 multiplication operations are needed in the first row elimination step of Gaussian elimination for candidate 5 (0, 0, 0, 0, 1, 0) and another 25 multiplication operations are needed in the first row elimination step of Gaussian elimination for candidate 6 (0, 0, 0, 0, 0, 1).

Sharing Intermediate Results of Gaussian Elimination in ALF Clipping Index Optimization Some embodiments of the present invention reduce the number of multiplication operations required in solving inverse matrices for ALF coefficients derivation in an ALF clipping index optimization process. In each iteration of the ALF clipping index optimization process, 6 inverse matrices corresponding to 6 clipping setting candidates need to be solved. Each inverse matrix is solved by Gaussian elimination to derive optimal ALF coefficients and then a SSD is calculated for each clipping setting candidate. A lowest SSD is then selected from a SSD of an initial clipping setting and SSDs associated with the 6 clipping setting candidates. The inverse matrices of the 6 clipping setting candidates correspond to similar linear equations of filter coefficients. In the following descriptions, the first clipping candidate setting is also referred to as candidate 1, the second clipping candidate setting is referred to as candidate 2, and so on. FIG. 6 illustrates an example of comparing the matrix entries of candidate 5 with the matrix entries of candidate 6 in one row elimination step of the ALF clipping index optimization process. The matrix entries inside the rectangle boxes are same entries in both candidates 5 and 6. The concept of the present invention solves inverse matrices for filter coefficients by sharing or reusing some operations or partial intermediate results in Gaussian elimination.

FIG. 7 illustrates an embodiment of sharing partial intermediate results in Gaussian elimination for solving the inverse matrices of candidates 5 and 6. The entry operations for matrix entries $e_{22}$, $e_{23}$, $e_{24}$, $y_2$, $e_{33}$, $e_{34}$, $y_3$, $e_{44}$, and $y_4$ associated with candidates 5 and 6 are exactly the same in the first row elimination step, thus these entry operations can be shared between candidate 5 and 6. A total of 25 multiplications is required for solving the inverse matrix of candidate 5 in the first row elimination step. For candidate 6, one multiplication is required for each of the 6 matrix entries $e_{25}$, $e_{26}$, $e_{35}$, $e_{36}$, $e_{45}$, and $e_{46}$, 4 multiplications are required for calculating matrix entries $e_{55}$, $e_{56}$, and $y_5$, and 3 multiplications are required for calculating matrix entries $e_{66}$ and $y_6$. A total of 13 multiplications (6+4+3) are needed for solving the inverse matrix of candidate 6 in the first row elimination step if reusing partial intermediate results of candidate 5. The number of multiplications for solving these two inverse matrices is reduced from 50 to 38. These two inverse matrices of candidates 5 and 6 can be solved in parallel or sequentially. The detailed descriptions of sharing or reusing partial intermediate results of Gaussian elimination for solving the inverse matrices associated with other candidates are omitted for brevity.

Table 1 shows the number of multiplication operations needed in each row elimination step for solving two 12-rank matrices with or without operation sharing. The number of multiplication operations is reduced from 176 to 113 in the first row elimination step when partial operations in solving two 12-rank inverse matrices are shared. In the second row elimination step to the tenth row elimination step for solving the 12-rank matrices, the number of multiplication operations required are also reduced. In this embodiment, the multiplication operations needed for all row elimination steps reduce from 1540 to 1075, which is 30.2% of reduction in solving the two 12-rank matrices.

TABLE 1

| Row Elimination | Without sharing operations | Sharing operations |
|---|---|---|
| 1 | 176 | 113 |
| 2 | 174 | 112 |
| 3 | 170 | 110 |
| 4 | 164 | 107 |
| 5 | 156 | 103 |
| 6 | 146 | 98 |
| 7 | 134 | 92 |
| 8 | 120 | 85 |
| 9 | 104 | 77 |
| 10 | 86 | 68 |
| 11 | 66 | 66 |
| 12 | 44 | 44 |

Table 2 shows the number of multiplication operations needed with or without sharing partial operations between two inverse matrices in each row elimination step for solving two 6-rank matrices. As shown in FIG. 7, the number of multiplication operations required in the first row elimination step is reduced from 50 to 38 when partial operations in solving two 6-rank inverse matrices are shared. The number of multiplication operations are also reduced in the second row elimination step to the fourth row elimination step for solving the 6-rank matrices. In this embodiment, the multiplication operations needed for all row elimination steps in Gaussian elimination reduce from 230 to 192, which is 16.5% of reduction in solving the two 6-rank matrices.

TABLE 2

| Row Elimination | Without sharing operations | Sharing operations |
| --- | --- | --- |
| 1 | 50 | 38 |
| 2 | 48 | 37 |
| 3 | 44 | 35 |
| 4 | 38 | 32 |
| 5 | 30 | 30 |
| 6 | 20 | 20 |

In the above embodiments, two inverse matrices are collectively solved by sharing partial intermediate results in parallel or sequentially, in some other embodiments, the number of inverse matrices collectively solved by sharing partial intermediate results can be set to a number other than two. For example, three inverse matrices associated with three clipping setting candidates are collectively solved by sharing partial operations in Gaussian elimination. Table 3 shows the reduction in numbers of multiplication operations required for solving K 12-rank inverse matrices independently and for solving K inverse matrices collectively. The number of multiplication operations shown in Table 3 considers the row elimination step with the most multiplication operations. For example, the number of multiplication operations drops from 264 to 136 when three 12-rank inverse matrices are solved collectively by sharing the partial intermediate results, the drop is equivalent to 48.5% of reduction. It is observed that the optimum number of inverse matrices collectively solved is 3 for 12-rank inverse matrices.

TABLE 3

| K | Without sharing operations | With sharing operations | Reduction % |
| --- | --- | --- | --- |
| 1 | 88 | 88 | 0 |
| 2 | 176 | 113 | 35.8% |
| 3 | 264 | 136 | 48.5% |
| 4 | 352 | 208 | 40.9% |
| 5 | 440 | 300 | 31.8% |
| 6 | 528 | 402 | 23.9% |
| 7 | 616 | 511 | 17.0% |
| 8 | 704 | 624 | 11.4% |
| 9 | 792 | 738 | 6.82% |
| 10 | 880 | 850 | 3.41% |
| 11 | 968 | 968 | 0 |

Figure 8:
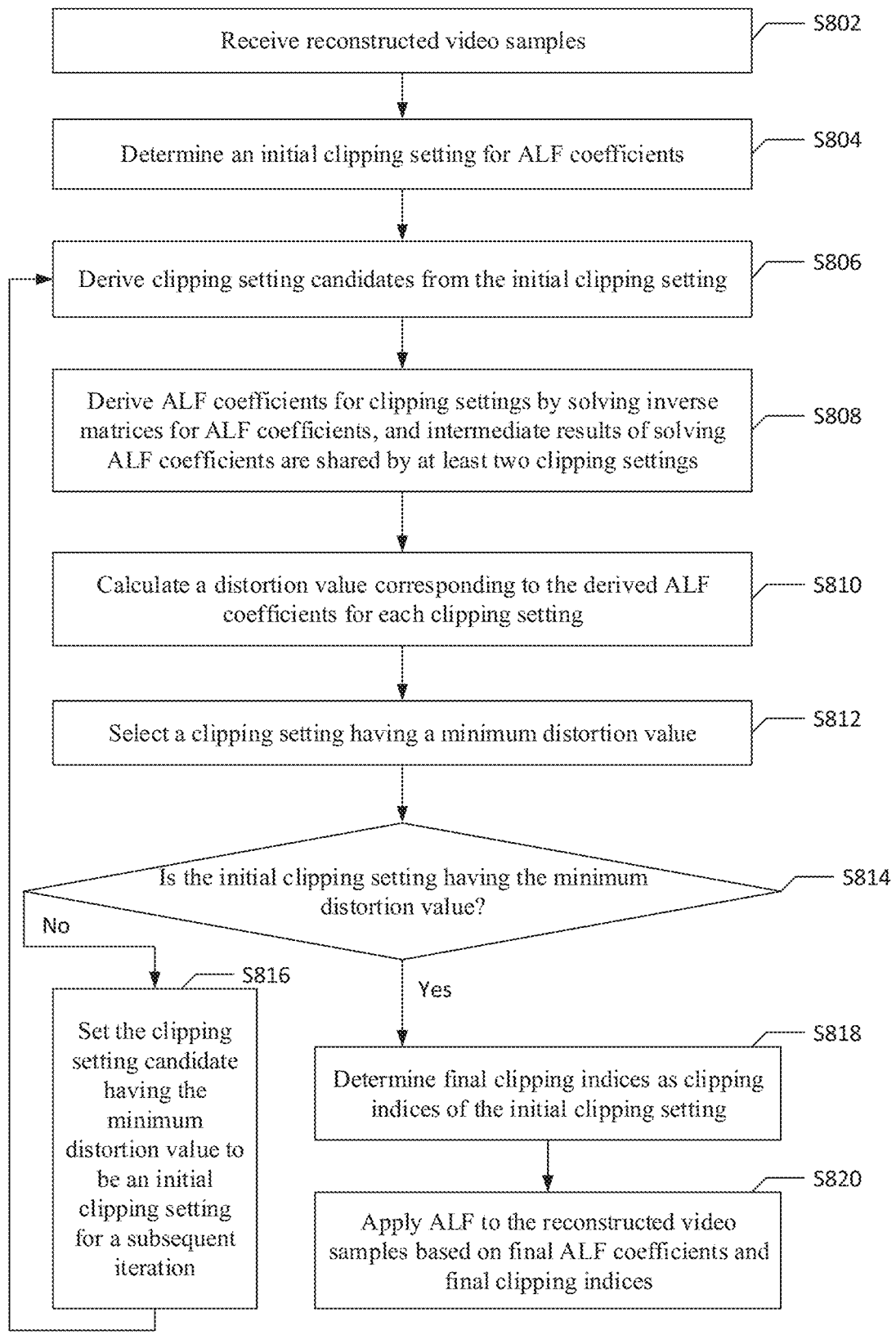
FIG. 8 is a flowchart illustrating an embodiment of the ALF clipping index optimization process with reduced computational complexity.

Representative Flowcharts for ALF clipping index optimization FIG. 8 is a flowchart illustrating implementing an exemplary embodiment of the ALF clipping index optimization process in a video encoding system. Reconstructed video samples are received by the video encoding system in step S802, and an initial clipping setting is determined for ALF coefficients in step S804. In step S806, a predetermined number of clipping setting candidates are derived from the initial clipping setting. For example, the predetermined number is equal to the number of ALF coefficients. Each clipping setting candidate is derived by adjusting one clipping index of the initial clipping setting while other clipping indices stay unchanged. For each clipping setting including the initial clipping setting and clipping setting candidates, optimal ALF coefficients are derived by solving an inverse matrix in step S808. Partial intermediate results of solving ALF coefficients are shared by two or more clipping settings in step S808. For example, inverse matrices associated with three clipping settings are solved collectively so some intermediate results in each row elimination step of Gaussian elimination can be shared between the three clipping settings. In this step, solving two or more inverse matrices collectively reduces the computational complexity of the ALF clipping index optimization process. In step S810, a distortion value such as a SSD corresponding to the derived ALF coefficients for each clipping setting is calculated. A clipping setting having a minimum distortion value is selected in step S812. The video encoding system checks whether the clipping setting having the minimum distortion value is the initial clipping setting in step S814, and determines final clipping indices as clipping indices of the initial clipping setting in step S818 when the initial clipping setting corresponds to the minimum distortion value. Otherwise, the clipping setting candidate having the minimum distortion value is set to be an initial clipping setting for a subsequent iteration in step S816 when the distortion value of the initial clipping setting is not the minimum distortion value. This initial clipping setting is used to derive multiple clipping setting candidates in steps S806, and the operations in steps S806 to S814 are performed to check if this initial clipping setting has a distortion value smaller than all the distortion values of the clipping setting candidates. If the initial clipping setting is not associated with the minimum distortion value, another iteration is performed until the distortion value of the initial clipping setting is the minimum distortion value of that iteration. After determining the final clipping indices, the video encoding system applies ALF to the reconstructed video samples based on the final ALF coefficients and final clipping indices in step S820.

Figure 9A:
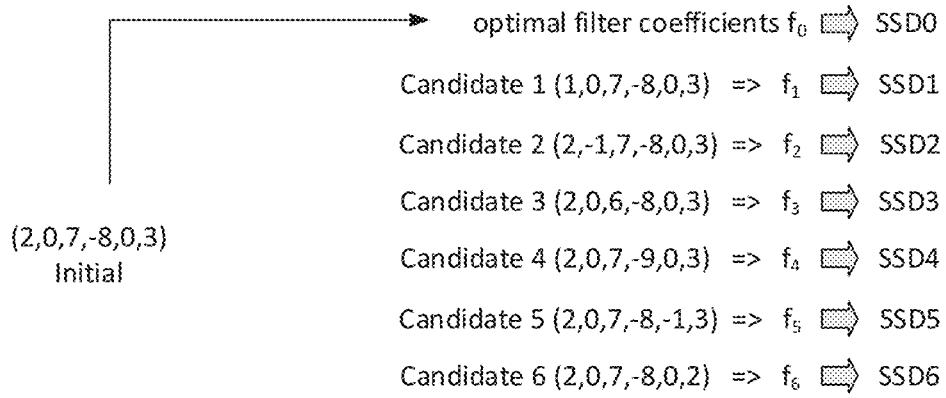
FIG. 9A illustrates the steps involved in a first iteration of deriving optimal quantized values of six ALF coefficients.
Figure 9B:
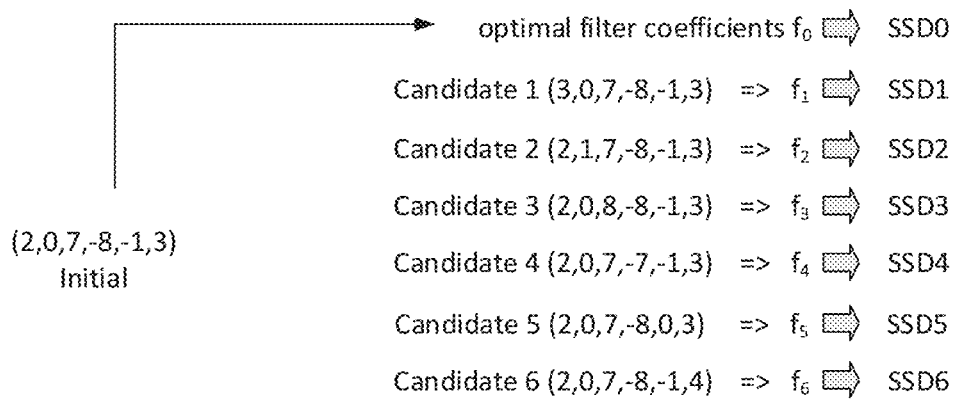
FIG. 9B illustrates the step involves in a second iteration of deriving optimal quantized values of six ALF coefficients.

SSD Comparison in ALF Coefficient Quantization Optimization Similar to the ALF clipping index optimization process, a ALF coefficient quantization optimization process starts from an initial setting with directly quantized coefficients, derives a number of setting candidates by adjusting one particular quantized coefficient by −1 with others unchanged for each setting candidate, and calculates a distortion value such as an SSD for each setting candidate. For example, an initial setting ($f_0$, $f_1$, $f_2$, $f_3$, $f_4$, $f_5$) for a 6 coefficient ALF is used to derive 6 setting candidates. Each of the 6 elements $f_0$ to $f_5$ in the initial setting or each setting candidate corresponds to a quantized value of a particular filter coefficient. The SSDs of the 6 setting candidates and the initial setting are compared to select a lowest SSD and determine a new initial setting for a second iteration. This new initial setting is used to derive 6 setting candidates by adjusting one particular coefficient by +1 with others unchanged in the second iteration. A distortion value for each setting candidate is calculated and compared to determine a new initial setting for a third iteration. This process is repeated until none of the setting candidate leads to a smaller SSD than the initial setting. FIG. 9A illustrates an example of deriving 6 setting candidates from an initial setting (2, 0, 7, −8, 0, 3) in a first iteration of the ALF coefficient quantization optimization process. Each setting candidate is derived by modifying one quantized value of a corresponding filter coefficient by −1. The SSDs of the setting candidates and initial setting are compared to find a minimum SSD among SSD0 to SSD6. In FIG. 9A, it is assumed that SSD5 associated with candidate 5 is the smallest SSD. FIG. 9B illustrates an example of deriving 6 setting candidates from candidate 5 of the first iteration (2, 0, 7, −8, −1, 3) in the second iteration of the ALF coefficient quantization optimization process. Each setting candidate in the second iteration is derived by modifying one quantized value of a corresponding filter coefficient by +1. SSD0 to SSD6 associated with the initial setting and setting candidates are calculated and compared to find a minimum SSD. This process is repeated until SSD0 is selected as none of the setting candidates leads to SSD reduction.

The distortion SSD in ALF of a single sample is calculated by Equation (4), and the SSD of an entire region is computed by summing over all pixels in the region as shown in Equation (5).

$$SSD = \left(org - \left(rec + \sum_c (n_c f_c)\right)\right)^2; \quad (4)$$

$$\sum_p (org_p - rec_p)^2 - 2\sum_c \left(\sum_p org_p - rec_p\right) n_{pc} \bigg) f_c + \quad (5)$$

$$\sum_{ci} \sum_{cj} \left(\sum_p n_{pci} n_{pcj}\right) f_i f_j = pixAcc + 2\sum_c y[c] f_c + \sum_{ci} \sum_{cj} E[ci][cj] f_i f_j.$$

The SSD of an entire region in Equation (5) can be represented by Equation (6), where pixAcc is the original distortion, y is a cross-correlation matrix, and E is an auto-correlation matrix. Equation (6) can also be used to calculate the SSD for a quantized coefficient setting in any iteration of the ALF coefficient quantization optimization process.

$$SSD(f)=pixAcc-2f^T y+f^T Ef; \quad (6)$$

where f is the quantized coefficients and pixAcc, y, E are previously collected ALF statistics. In the first iteration, 7 times of SSD calculation are required to compute SSD0 to SSD6 for the initial setting and 6 setting candidates. In any of the subsequent iteration, 6 times of SSD calculation are required to compute SSD1 to SSD6 for 6 new candidate settings.

Embodiments of the present invention determine the best setting with a lowest distortion in ALF coefficient quantization optimization by computing distortion differences between the initial setting and each setting candidate instead of computing the distortion values of the initial setting and the 6 setting candidates. For example, an SSD difference between two SSDs is calculated by Equation (7).

$$\Delta SSD(f,c)=SSD(f+c)-SSD(f)=c(cE_{ii}+2(E_i f-y_i)); \quad (7)$$

where f is the initial state of the quantized coefficients, i is the index of the to-be-adjusted coefficients, c is the amount to adjust, $y_i$ is the i-th entry of vector y, $E_i$ is the i-th row of E, and $E_{ii}$ is the (i,i) entry of E. In this embodiment of SSD comparison in the ALF coefficient quantization optimization process, c is equal to −1 or +1. The SSD difference derivation formula in Equation (7) is simplified as shown in Equation (8).

$$\Delta SSD(f, c) = SSD(f + c) - SSD(f) \quad (8)$$
$$= pixAcc - 2(f + c)^T y + (f + c)^T E(f + c) - \left(pixAcc - 2f^T y + f^T Ef\right)$$
$$= -2c^T y + \left(f^T Ec + c^T Ef + c^T Ec\right) = -2cy_i + \left(cf^T E_i + cE_i f + c^2 E_{ii}\right)$$
$$= c(cE_{ii} + 2(E_i f - y_i));$$

where c=[0, 0, . . . , c, . . . , 0] with only the i-th entry is non-zero.

In the ALF coefficient quantization optimization process as shown in FIG. 9A, six SSD difference calculations are required in the first iteration according to an embodiment of the present invention. The six SSD differences are differences between SSD0 associated with the initial setting and each of SSD1 to SSD6 associated with the 6 setting candidates. Another six SSD difference calculations are required in the second iteration as shown in FIG. 9B. The difference of SSDs between two quantization candidates is directly derived without the calculation of each SSD. Compared to computing the SSD for each ALF coefficient quantization setting, computing SSD differences for deriving optimal ALF coefficients reduces the number of multiplication operations significantly. According to the SSD derivation formula as shown in Equation (6), n multiplication operations are required to calculate the term $f^T y$, $n^2$ multiplication operations are required to calculate the term Ef, then n multiplication operations are required to calculate the term $f^T Ef$, where n is the matrix rank. In the example as shown in FIG. 9A and FIG. 9B, n is equal to 6. A total of $n^2+2n$ multiplication operations is need for calculating an SSD associated with an n-rank matrix. The number of addition operations are similar to the number of multiplication operations, and most of the operations are inner products. In an embodiment of computing SSD differences using the formula as shown in Equation (8), n multiplication operations are required to calculate the term Ed, and c is equal to +1 or −1. A total of n multiplication operations is needed for calculating an SSD difference associated with two n-rank matrices. The number of addition operations is similar to the multiplication operations with most of the operations are inner products.

In one embodiment of the present invention, the ALF coefficient quantization optimization process only performs one iteration, which determines final quantized values for the ALF coefficients to be quantized values of the initial setting or quantized values of the setting candidate having the minimum distortion difference. For example, the final quantized values are quantized values of the initial setting when the minimum distortion difference is greater than or equal to zero, or the final quantized values are quantized values of the setting candidate having the minimum distortion difference when the minimum distortion difference is less than zero. In some other embodiments of the present invention, multiple iterations are performed by assigning the setting candidate having the minimum distortion difference to be an initial setting for a subsequent iteration. In each iteration, the initial setting is used to derive multiple setting candidates, and a distortion difference between the initial setting and each setting candidate is computed without computing a distortion value for each setting candidate. The final quantized values for the ALF coefficients are determined to be quantized values of the initial setting when the minimum distortion difference is greater than or equal to zero or when all the distortion differences are greater than or equal to zero. Otherwise, the setting candidate having the minimum distortion difference is set as an initial setting for a subsequent iteration, and the ALF coefficient quantization optimization process terminates when the final quantized values are set to be the quantized values of the initial setting.

Figure 10:
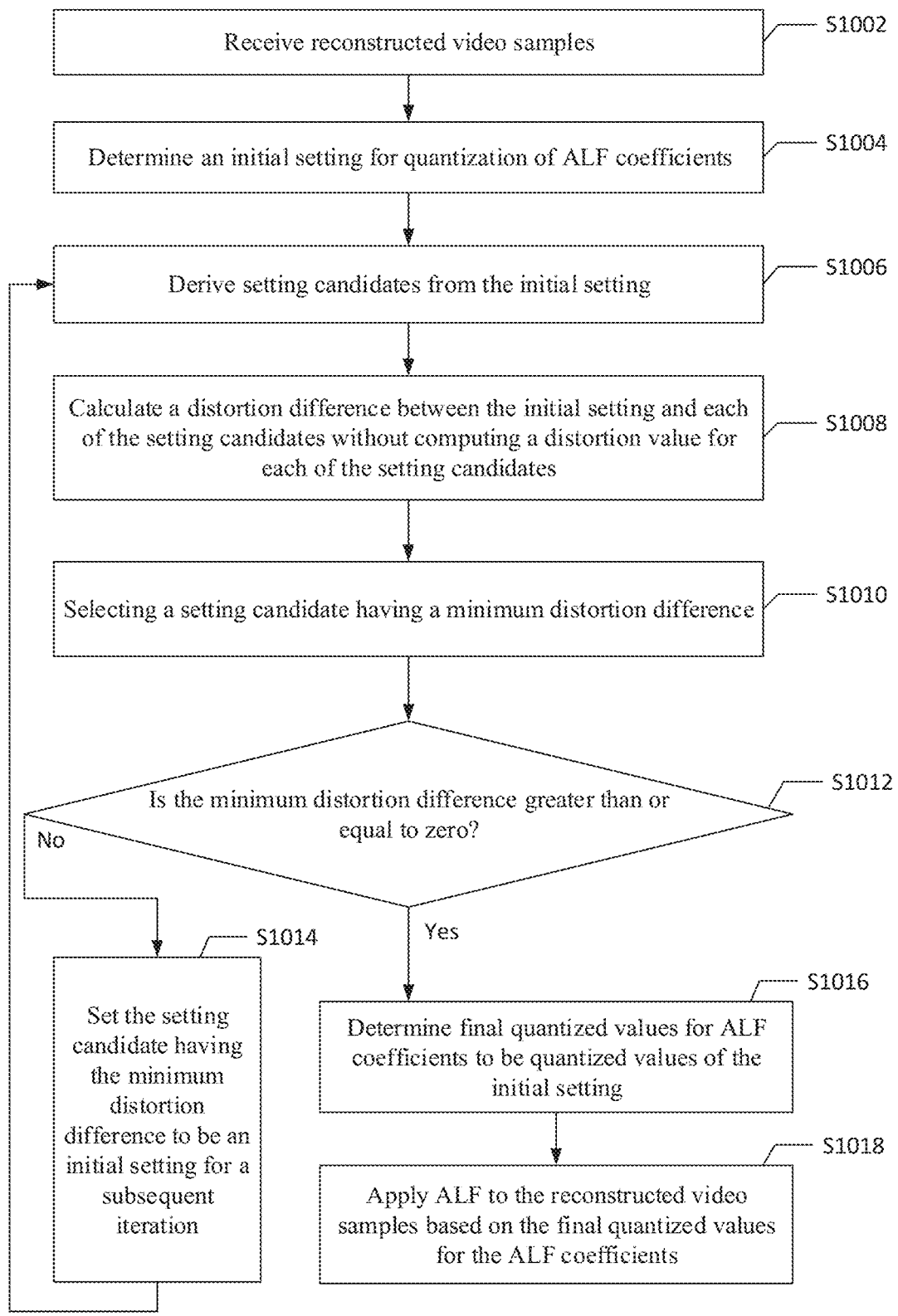
FIG. 10 is a flow chart illustrating an embodiment of the ALF coefficient quantization optimization process with reduced computational complexity.

Representative Flowcharts for ALF Coefficient Quantization Optimization FIG. 10 is a flowchart illustrating implementing an exemplary embodiment of the ALF coefficient quantization optimization process in a video encoding system. In step S1002, the video encoding system receives reconstructed video samples. An initial setting for quantization of ALF coefficients is determined in step S1004 to derive a number of setting candidates in step S1006. For example, the number of setting candidates is equal to the number of ALF coefficients, and each setting candidate only alters one quantized coefficient of the initial setting. A distortion difference between the initial setting and each of the setting candidates is calculated without calculating a distortion value for each setting candidate in step S1008. This step reduces the computational complexity of the ALF coefficient quantization optimization process. A setting candidate having a minimum distortion difference is selected in step S1010. The video encoding system checks if the minimum distortion difference is larger than or equal to zero in step S1012, and determines final quantized values for the ALF coefficients to be quantized values of the initial setting in step S1016 when the minimum distortion difference is larger than or equal to zero. The initial setting corresponds to a minimum distortion among the initial setting and setting candidates when the minimum distortion difference is larger than or equal to zero. The reconstructed video samples are filtered by ALF filtering based on the final quantized values for the ALF coefficients in step S1018. If the minimum distortion difference is less than zero, the setting candidate having the minimum distortion difference becomes an initial setting for a subsequent iteration of the ALF coefficient quantization optimization process in step S1014. Steps S1006 to S1012 are repeated for each iteration until the minimum distortion difference is larger than or equal to zero in step S1012. In another embodiment, steps S1010 and S1012 are replaced by checking whether all the distortion differences calculated in step S1008 are larger than or equal to zero. The initial setting corresponds to a minimum distortion when all the distortion differences are greater than or equal to zero.

Figure 11:
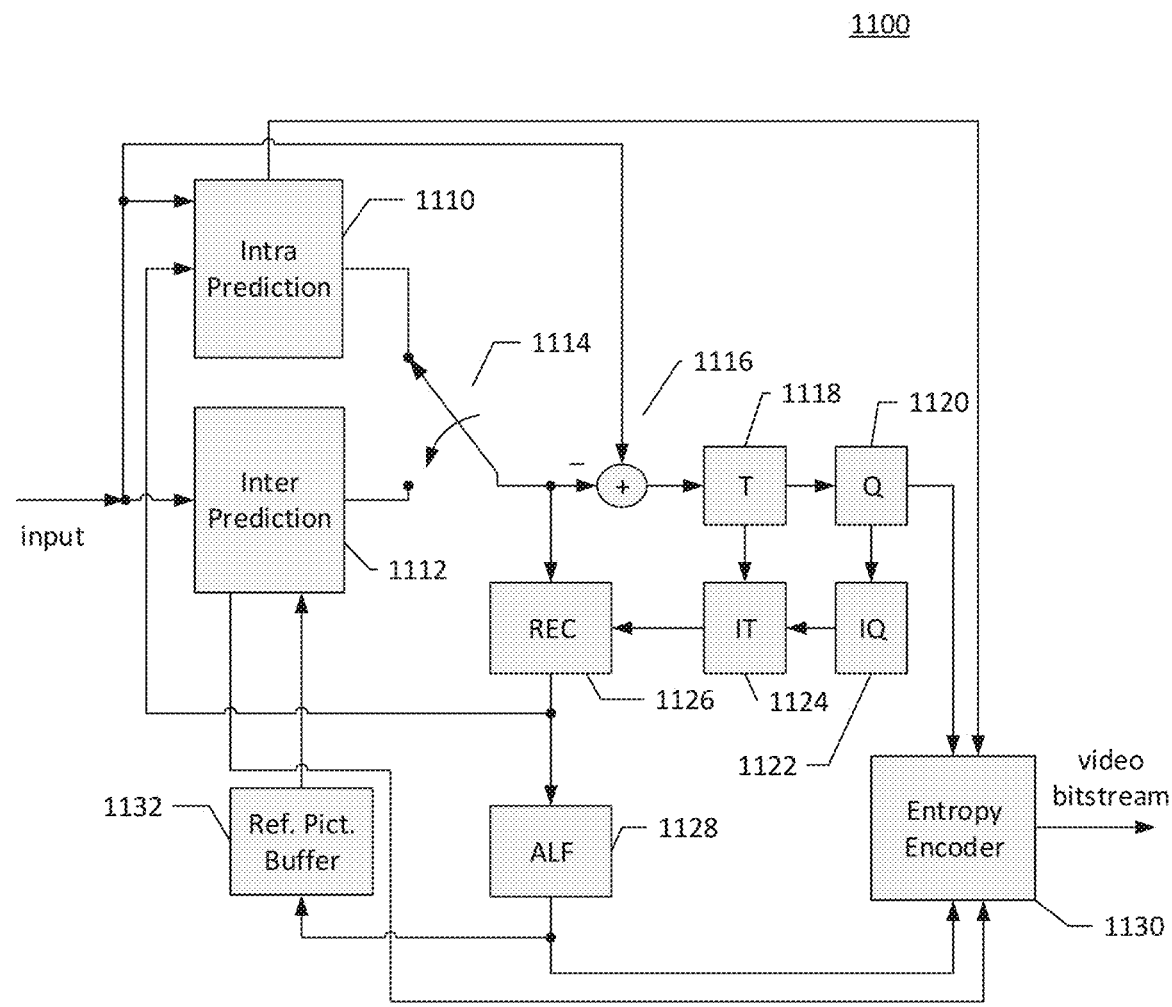
FIG. 11 illustrates an exemplary system block diagram for a video encoding system incorporating one or a combination of the ALF derivation methods according some embodiments of the present invention.

Representative System Block Diagrams FIG. 11 illustrates an exemplary system block diagram for a Video Encoder 1100 implementing one or more embodiments of the ALF clipping index optimization process or ALF coefficient quantization optimization process. Intra Prediction module 1110 provides intra predictors based on reconstructed video data of a current picture. Inter Prediction module 1112 performs Motion Estimation (ME) and Motion Compensation (MC) to provide predictors based on referencing video data from other picture or pictures. Either Intra Prediction module 1110 or Inter Prediction module 1112 supplies the selected predictor to Adder 1116 to form residues. The residues of the current block are further processed by Transformation module (T) 1118 followed by Quantization module (Q) 1120. Quantization module 1120 receives transform coefficients of each transform block from Transformation module 1118, and applies a quantization processing to generate a transformed and quantized residual signal. The transformed and quantized residual signal is then encoded by Entropy Encoder 1130 to form a video bitstream. The video bitstream is then packed with side information. The transformed and quantized residual signal of the current block is processed by Inverse Quantization module (IQ) 1122 and Inverse Transformation module (IT) 1124 to recover the prediction residues. As shown in FIG. 11, the residues are recovered by adding back to the selected predictor at Reconstruction module (REC) 1126 to produce reconstructed video data. The reconstructed video data may be stored in Reference Picture Buffer (Ref. Pict. Buffer) 1132 and used for prediction of other pictures. The reconstructed video data from REC module 1126 may be subject to various impairments due to the encoding processing, consequently, Adaptive Loop Filter (ALF) 1128 is applied to the reconstructed video data before storing in the Reference Picture Buffer 1132 to further enhance picture quality. According to an embodiment of the ALF clipping index optimization process, partial intermediate results of solving ALF coefficients are shared by two or more ALF clipping settings. According to an embodiment of the ALF coefficient quantization optimization process, distortion differences between two quantization settings for ALF coefficients are calculated instead of calculating a distortion value for each of the quantization settings. Syntax elements are provided to Entropy Encoder 1130 for incorporation into the video bitstream.

Various components of Video Encoder 1100 in FIG. 11 may be implemented by hardware components, one or more processors configured to execute program instructions stored in a memory, or a combination of hardware and processor. For example, a processor executes program instructions to apply ALF filtering to reconstructed video samples. The processor is equipped with a single or multiple processing cores. In some examples, the processor executes program instructions to perform functions in some components in Encoder 1100, and the memory electrically coupled with the processor is used to store the program instructions, information corresponding to the reconstructed images of blocks, and/or intermediate data during the encoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above.

Embodiments of the video data processing method performing a specific process on a current slice in a video encoding system may be implemented in a circuit integrated into a video compression chip or program code integrated into video compression software to perform the processing described above. For examples, scaling transform coefficient levels in a current transform block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A video encoding method for an Adaptive Loop Filter (ALF) clipping index optimization process in a video encoding system, comprising:

receiving reconstructed video samples;

determining an initial clipping setting for ALF coefficients;

deriving a plurality of clipping setting candidates from the initial clipping setting;

deriving ALF coefficients for a plurality of clipping settings by solving inverse matrices for ALF coefficients, wherein the clipping settings include the initial clipping setting and clipping setting candidates, and partial intermediate results of solving ALF coefficients are shared by two or more clipping settings;

calculating a distortion value corresponding to the derived ALF coefficients for each of the clipping settings;

determining final clipping indices for final ALF coefficients according to the distortion values, wherein determining final clipping indices for final ALF coefficients comprises comparing the distortion values associated with the clipping settings, selecting a clipping setting having a minimum distortion value, and determining the final clipping indices to be clipping indices of the clipping setting having the minimum distortion value, or determining clipping indices of the initial clipping setting to be the final clipping indices when the clipping setting having the minimum distortion value is the initial clipping setting, and determining an initial clipping setting for a subsequent iteration of the ALF clipping index optimization process to be the clipping setting having the minimum distortion value when the clipping setting having the minimum distortion value is one of the clipping setting candidates; and applying ALF filtering to the reconstructed video samples based on the final ALF coefficients and the final clipping indices.

2. The method of claim 1, wherein the initial clipping setting for the subsequent iteration is determined to be the clipping setting having the minimum distortion value and the subsequent iteration of the ALF clipping index optimization process comprises:

deriving a plurality of clipping setting candidates from the initial clipping setting;

deriving ALF coefficients for a plurality of clipping settings by solving inverse matrices for ALF coefficients, wherein the clipping settings include the initial clipping setting and clipping setting candidates, and partial intermediate results of solving ALF coefficients are shared by two or more clipping settings;

calculating a distortion value corresponding to the derived ALF coefficients for each of the clipping settings;

comparing the distortion values associated with the clipping settings;

selecting a clipping setting having a minimum distortion value;

determining clipping indices of the initial clipping setting to be the final clipping indices when the clipping setting having the minimum distortion value is the initial clipping setting; and determining an initial clipping setting for another subsequent iteration of the ALF clipping index optimization process to be the clipping setting having the minimum distortion value when the clipping setting having the minimum distortion value is one of the clipping setting candidates.

3. The method of claim 2, wherein the steps for each subsequent iteration of the ALF clipping index optimization are repeated until clipping indices of the initial setting are determined to be the final clipping indices.

4. The method of claim 1, wherein deriving said plurality of clipping setting candidates from the initial clipping setting comprises deriving each clipping setting candidate by only adjusting one clipping index of the initial clipping setting.

5. The method of claim 1, wherein the inverse matrices associated with the clipping settings sharing the partial intermediate results are collectively solved in parallel.

6. The method of claim 1, wherein the inverse matrices associated with the clipping settings sharing the partial intermediate results are collectively solved sequentially.

7. The method of claim 1, wherein each of the clipping settings contains twelve clipping indices when the reconstructed video samples are luminance (luma) samples, each of the clipping settings contains six clipping indices when the reconstructed video samples are chrominance (chroma) samples, or each of the clipping settings contains seven clipping indices when applying Cross Component ALF (CCALF) to the reconstructed video samples.

8. The method of claim 1, wherein the partial intermediate results of solving ALF coefficients shared by the two or more clipping settings correspond to matrix entries with same entry operations to be performed in a row elimination step of Gaussian elimination.

9. A video encoding method for an Adaptive Loop Filter (ALF) coefficient quantization optimization process in a video encoding system, comprising:

receiving reconstructed video samples;

determining an initial setting for quantization of ALF coefficients;

deriving a plurality of setting candidates from the initial setting;

calculating a distortion difference between the initial setting and each of the setting candidates without computing a distortion value for each of the setting candidates;

determining final quantized values for the ALF coefficients according to the distortion differences, wherein determining final quantized values for the ALF coefficients comprises comparing the distortion differences associated with the setting candidates, selecting a setting candidate having a minimum distortion difference, and determining the final quantized values for the ALF coefficients to be quantized values of the initial setting or quantized values of the setting candidate having the minimum distortion difference; and applying ALF filtering to the reconstructed video samples based on the final quantized values for the ALF coefficients.

10. The method of claim 9, wherein determining final quantized values for the ALF coefficients comprises:

determining the final quantized values for the ALF coefficients to be quantized values of the setting candidate having the minimum distortion difference when the minimum distortion difference is less than 0; and determining the final quantized values for the ALF coefficients to be quantized values of the initial setting when the minimum distortion difference is larger than or equal to 0.

11. The method of claim 9, wherein determining final quantized values for the ALF coefficients comprises:

determining the final quantized values for the ALF coefficients to be quantized values of the initial setting when the minimum distortion difference is larger than or equal to 0; and determining an initial setting for a subsequent iteration of the ALF coefficient quantization optimization process to be the setting candidate having the minimum distortion difference when the minimum distortion difference is less than 0;
determining an initial setting for a subsequent iteration of the ALF coefficient quantization optimization process to be the setting candidate having the minimum distortion difference when the minimum distortion difference is less than 0.

12. The method of claim 11, wherein the initial setting for the subsequent iteration is determined to be the setting candidate having the minimum distortion difference, and the subsequent iteration of the ALF coefficient quantization optimization process comprises:
deriving a plurality of setting candidates from the initial clipping setting;
calculating a distortion difference between the initial setting and each of the setting candidates without computing a distortion value for each of the setting candidates;
comparing the distortion differences associated with the setting candidates for the subsequent iteration to select a setting candidate having a minimum distortion difference;
determining the final quantized values for the ALF coefficients to be quantized values of the initial setting when the minimum distortion difference is larger than or equal to 0; and
determining an initial setting for another subsequent iteration of the ALF coefficient quantization optimization process to be the setting candidate having the minimum distortion difference when the minimum distortion difference is less than 0.

13. The method of claim 12, wherein the steps for the subsequent iteration of the ALF coefficient quantization optimization process are repeated until the final quantized values for the ALF coefficients are determined to be quantized values of the initial setting.

14. The method of claim 9, wherein deriving a plurality of setting candidates from the initial setting comprises deriving each setting candidate by only adjusting one quantized value of the initial setting.

15. An apparatus for an ALF clipping index optimization process in a video encoding system, the apparatus comprising one or more electronic circuits configured for:
receiving reconstructed video samples;
determining an initial clipping setting for ALF coefficients;
deriving a plurality of clipping setting candidates from the initial clipping setting;
deriving ALF coefficients for a plurality of clipping settings by solving inverse matrices for ALF coefficients, wherein the clipping settings include the initial clipping setting and clipping setting candidates, and partial intermediate results of solving ALF coefficients are shared by two or more clipping settings;
calculating a distortion value corresponding to the derived ALF coefficients for each of the clipping settings;
determining final clipping indices for final ALF coefficients according to the distortion values, wherein determining final clipping indices for final ALF coefficients comprises comparing the distortion values associated with the clipping settings, selecting a clipping setting having a minimum distortion value, and
determining the final clipping indices to be clipping indices of the clipping setting having the minimum distortion value, or
determining clipping indices of the initial clipping setting to be the final clipping indices when the clipping setting having the minimum distortion value is the initial clipping setting, and determining an initial clipping setting for a subsequent iteration of the ALF clipping index optimization process to be the clipping setting having the minimum distortion value when the clipping setting having the minimum distortion value is one of the clipping setting candidates; and
applying ALF filtering to the reconstructed video samples based on the final ALF coefficients and the final clipping indices.

* * * * *